Patented Mar. 3, 1942

2,275,164

UNITED STATES PATENT OFFICE 2,275,164

CELLULAR THERMOPLASTIC MASS

Robert M. Thomas, Union, and William J. Sparks, Cranford, N. J., assignors to Standard Oil Development Company, a corporation of Delaware No Drawing. Application December 31, 1938, Serial No. 248,906

9 Claims. (Cl. 260—94)

This invention relates to the production of thermoplastic masses of cellular structure.

It is an object of this invention to produce thermoplastic material, such as halogenated isobutylene polymer, halogenated rubber and the like, in the form of small discrete particles which possess a cellular structure. It is a further object of the invention to produce such materials by simple, convenient and economical means. It is a still further object of the invention to produce discrete, cellular forms of materials which possess good stability to light and which are susceptible of wide variation in physical properties by alteration of the chemical structure of the same or by addition of other materials.

It has been found that certain thermoplastic materials, particularly those of an organic polymeric composition, will, on drying from a solution at ordinary temperatures to a sufficient extent to permit pulverizing, retain a sufficient amount of the solvent to cause expansion of the powder particles into cellular form when treated according to the method of the present invention. In general, the method of the invention comprises selecting a thermoplastic material containing a small amount of solvent, or treating the material with a solvent and drying to a sufficient extent to permit grinding to a powder, allowing a small but appreciable amount of the solvent to remain in the material, and heating the material at atmospheric pressure or in a vacuum at a temperature substantially higher than the boiling point of the solvent at the pressure at which the heating takes place. Superatmospheric pressure is neither necessary nor desired. Each individual particle of the powder which is heated expands by the vaporization of the solvent contained therein, but without causing the particles to coalesce.

The materials which may be treated according to the method of this invention include polymeric organic substances, particularly halogenated substantially saturated long linear polymeric hydrocarbons, such as halogenated isobutylene polymer, halogenated hydro-rubber, and halogenated ethylene polymer; and further materials which may be so treated include polymerized styrenes, polymerized methacrylates, polyindenes, halogenated rubber and products of the halogenation of co-polymers formed by the co-polymerization of various resin-forming substances, e. g., the co-polymers of iso-olefins and diolefins, such as the co-polymer of isobutylene and butadiene, also cellulose ethers and esters, and in fact any thermoplastic material having an appreciable tendency to solvent retention and sufficient hardness to be powdered and to retain its expanded form under the conditions of treatment. Although the invention may be applied to powders having particles of all shapes and sizes, it is in general desirable that the material undergoing treatment be powdered to a fineness of 20 or 30 to 100 mesh, or higher.

As solvents for producing the desired expansion of the particles may be used any of the well known solvents for the substances to be treated. Carbon tetrachloride, for example, is suitable for use with chlorinated polyisobutylene, polystyrenes and polyindenes; ketones may be used with polymerized methacrylates, and light aromatic hydrocarbons may be used with cellulose ethers.

The amount of solvent to be retained in the powdered material before submitting to the heat treatment should be sufficient to cause substantial expansion of the particles but not so much as to cause coalescence of the particles at the temperature of treatment. This solvent may be present in the material owing to the method of manufacture of the latter; or it may be added to form a solution of the material, and then evaporated until a pulverizable, practically dry material remains. The amount of solvent retained should in general be not higher than 8–10% and usually about 5%; but proportions as low as 1 to 2%, and in some cases as low as 0.1%, will give the desired result. The time of heating is not critical, but should simply be sufficient to produce the desired expansion of volume. It is important, however, that the powdered material be brought to the temperature of treatment as quickly as possible to prevent loss of solvent by diffusion before expansion of the particles takes place. This may be accomplished by any convenient means, as by quickly exposing a shallow layer of the powder to air heated to the temperatures of treatment. Another suitable method consists in carrying the powder by means of a gas blast into contact with a mass of gas heated to a temperature sufficiently high to raise the particles of powder to the desired temperature.

If desired, the properties of the material to be treated may be modified by adding a plasticizer before reducing to a powder.

The product, from whatever material derived, is an exceptionally light, easily handled material, consisting of entirely discrete spherical particles of cellular structure. It has an extremely low apparent density, of the order of 0.1 or less, and very high thermal and electrical resistivity.

These properties give the material great value for thermal and electrical insulation. Owing to its structure, it may be easily poured or pressed into any space where insulation is desired, as in the walls of a refrigerator, or in a space surrounding electrical apparatus. The cellular and discrete structure also renders the material suitable for very rapid solution, as in the preparation of coating compositions of various kinds.

This invention is of particular value in providing a means for preparing a halogenated isobutylene polymer in discrete cellular form. Chlorinated isobutylene polymer, for example, is a valuable plastic material resembling chlorinated rubber, but having the advantage of being quite stable to light and having the further advantage that it may be prepared in a variety of forms, with corresponding variety of physical properties, depending upon its molecular weight and upon its chlorine content. Generally a product containing at least 40% of chlorine, and prepared by the chlorination of isobutylene polymer of a molecular weight of at least 1000, is of sufficient hardness to be powdered and treated according to the present invention.

The following examples illustrate the method of preparing a cellular thermoplastic material according to the present invention:

Example I

An isobutylene polymer of about 60,000 to 70,000 molecular weight, prepared by the polymerization of isobutylene in the presence of boron fluoride at about $-78°$ C., was dissolved in carbon tetrachloride and treated with chlorine in the presence of sunlight to produce a material having a chlorine content of about 50% by weight of the chlorinated product. The chlorinated product was precipitated from the carbon tetrachloride solution by adding alcohol, dried at room temperature until it contained about 5% of residual carbon tetrachloride and then ground to a fine powder. The powder, exposed in layers 2 or 3 inches in depth, was placed in a vacuum oven already heated to about 100° C., and was maintained therein at this temperature, under an absolute pressure of about 20 mm. of mercury, for about 3 or 4 hours. It was then withdrawn and cooled to room temperature. The product appeared as small separate spheres and had an apparent density of somewhat less than 0.1, determined by weighing a standard volume measure filled loosely with the material.

Example II

Polymerized ethylene, obtained by subjecting ethylene containing about from .05% to 3% of oxygen or oxygen free ethylene to a pressure of 1500–2000 atmospheres and a temperature of 150–400° C., is chlorinated by dissolving 100 parts of the solid ethylene polymer (average molecular weight 5600) in 500 cc. of carbon tetrachloride at the boiling point and passing in chlorine gas at about 70° C. for 100 hours. The product contains 53.5% chlorine and is a hard resin-like substance. On precipitation and drying under ordinary conditions the product may be powdered while still containing a small amount of solvent. On heating the powdered product under vacuum at a temperature above the boiling point of the solvent, a cellular powder of low apparent density is obtained.

The scope of the invention is not limited by the particular examples, modifications and embodiments which have been given merely for the sake of illustration, but only by the appended claims in which it is intended to claim all novelty inherent in the invention as broadly as the prior art permits.

We claim:

1. The method of producing rounded particles of organic material having a cellular structure which comprises heating a polymeric organic thermoplastic material, in the form of a powder containing a small percentage of a solvent for said material, at a temperature higher than the boiling point of said solvent while maintaining a pressure sufficiently low to cause the said solvent to boil at a temperature below that which would cause the particles of said thermoplastic material to coalesce, whereby there is formed a plurality of separate expanded rounded particles.

2. The method of producing rounded particles of organic material having a cellular structure which comprises grinding to a powder of at least 20 mesh fineness a portion of a polymeric organic thermoplastic material containing a small percentage of a solvent therefor and heating the powder thus formed at a temperature substantially higher than the boiling point of said solvent while maintaining the pressure sufficiently low to cause the said solvent to boil at a temperature below that which would cause the particles of said thermoplastic material to coalesce, said thermoplastic material being of sufficient hardness at ordinary temperatures to retain an expanded form without coalescence of its particles, whereby there is formed a plurality of separate expanded rounded particles.

3. The method of producing rounded particles of organic material having a cellular structure which comprises heating a thermoplastic halogenated, substantially saturated long chain linear polymeric hydrocarbon, in the form of a powder containing a small percentage of a solvent for said halogenated hydrocarbon, at a temperature higher than the boiling point of said solvent while maintaining a pressure sufficiently low to cause said solvent to boil at a temperature below that which would cause the particles of said hydrocarbon to coalesce, whereby there is formed a plurality of separate expanded rounded particles.

4. The method of producing rounded particles of organic material having a cellular structure which comprises heating a thermoplastic halogenated isobutylene polymer, in the form of a powder containing a small percentage of a solvent for said polymer, at a temperature higher than the boiling point of said solvent while maintaining a pressure sufficiently low to cause the said solvent to boil at a temperature below that which would cause the particles of said polymer to coalesce, whereby there is formed a plurality of separate expanded rounded particles.

5. The method of producing rounded particles of organic material having cellular structure which comprises grinding to a powder a portion of a thermoplastic halogenated isobutylene polymer containing a small percentage of a solvent for said polymer and heating the same at a temperature higher than the boiling point of said solvent while maintaining a pressure sufficiently low to cause the said solvent to boil at a temperature below that which would cause the particles of said polymer to coalesce, whereby there is formed a plurality of separate expanded rounded particles.

6. The method of producing rounded particles of organic material having a cellular structure which comprises heating a thermoplastic chlorinated isobutylene polymer, in the form of a powder containing a small percentage of carbon tetrachloride, the heating being conducted at a temperature substantially higher than the boiling point of said carbon tetrachloride at the prevailing pressure, whereby there is formed a plurality of separate expanded rounded particles.

7. The method of producing rounded particles of organic material having a cellular structure which comprises chlorinating an isobutylene polymer of about 60,000 to 70,000 molecular weight in solution in the presence of sunlight, whereby a chlorinated polymer containing about 50% by weight of chlorine is obtained, and heating the chlorinated isobutylene polymer in the form of a powder containing about 5% of carbon tetrachloride, the heating being conducted at a temperature of about 100° C., and under an absolute pressure of about 20 mm. of mercury, for a period of about 3 to 4 hours, whereby there is formed a plurality of separate expanded rounded particles.

8. The method of producing rounded particles of organic material having a cellular structure which comprises heating a thermoplastic halogenated co-polymer of isoolefin and a diolefin, in the form of a powder containing a small percentage of a solvent for said halogenated co-polymer, at a temperature higher than the boiling point of said solvent while maintaining a pressure sufficiently low to cause the said solvent to boil at a temperature below that which would cause the particles of said halogenated co-polymer to coalesce, whereby there is formed a plurality of separate expanded rounded particles.

9. The method of producing rounded particles of organic material having a cellular structure which comprises heating a thermoplastic halogenated co-polymer of isobutylene and butadiene, in the form of a powder containing a small percentage of a solvent for said halogenated copolymer, at a temperature higher than the boiling point of said solvent while maintaining the pressure sufficiently low to cause the solvent to boil at a temperature below that which would cause the particles of said halogenated co-polymer to coalesce, whereby there is formed a plurality of separate expanded rounded particles.

ROBERT M. THOMAS.
WILLIAM J. SPARKS.